United States Patent [19]
Chrobak

[11] 3,961,657
[45] June 8, 1976

[54] HIGH SPEED RADIAL PLY TIRE

[75] Inventor: Dennis Steven Chrobak, Silver Lake, Ohio

[73] Assignee: The Goodyear Tire & Rubber Company, Akron, Ohio

[22] Filed: May 3, 1974

[21] Appl. No.: 466,750

[52] U.S. Cl. .............................................. 152/355
[51] Int. Cl.² ............................................. B60C 5/12
[58] Field of Search ........... 152/153, 330, 352, 357, 152/353, 354, 356, 359, 362 R, 362 CS, 380, 383, 330 L, 355

[56] References Cited
UNITED STATES PATENTS

| | | | |
|---|---|---|---|
| 3,237,672 | 3/1966 | McMannis .......................... | 152/352 |
| 3,253,635 | 5/1966 | Travers .............................. | 152/354 |
| 3,515,196 | 6/1970 | Floria ................................ | 152/352 |
| 3,638,705 | 2/1972 | Devienne et al. ................ | 152/362 R |
| 3,682,223 | 8/1972 | Simpson ........................... | 152/362 R |

FOREIGN PATENTS OR APPLICATIONS 550,658  2/1957  Belgium ............................ 152/361

Primary Examiner—Allen N. Knowles
Assistant Examiner—Hadd Lane
Attorney, Agent, or Firm—F. W. Brunner; M. L. Gill

[57] ABSTRACT

A radial ply pneumatic tire having an axial spacing between the beads when in the mold which is greater than the axial spacing of the beads when mounted on a rim and in which the width of the ground contacting tread surface is no greater than the axial spacing of the beads when mounted on a rim. The tire is further characterized by an annular recess in each outer sidewall for disassociating the tread structure from the sidewalls and lower bead areas, and a wedge of hard rubber bridging the space between the rim flange and lower sidewall portion for improving the reaction between the rim and a specially rigidified lower sidewall area to provide rapid steering response.

The foregoing abstract is not to be taken as limiting the invention of this application, and in order to understand the full nature and extent of the technical disclosure of this application, reference must be made to the accompanying drawings and the following detailed description.

19 Claims, 3 Drawing Figures

HIGH SPEED RADIAL PLY TIRE

BACKGROUND OF THE INVENTION

This invention relates to pneumatic tires and in particular to a radial ply pneumatic tire having overall improved high speed operating characteristics.

There are currently three basic types of pneumatic tires available to the motoring public. The first is the bias ply tire in which the reinforcing cords in the plies in the body of the tire extend diagonally from bead to bead across the tire structure and the cords in each ply are usually crossed with respect to the cords in adjacent plies.

The second basic type of tire is the bias belted tire which is similar to the bias tire but includes a belt structure. The belt structure is one or more layers of reinforcing material which extend circumferentially about the tire and beneath the tread portion and terminates in axial directions at approximately beneath the outer edges of the tread portion. This belt structure serves to restrict the outer circumference of the tire and provides a more rigid tread portion.

The third basic tire construction is the radial ply tire. This tire is characterized by the cords in the body plies extending from bead to bead in radial directions. In other words, the cords in the body plies lie substantially in planes containing the rotational axis of the tire. The radial ply tire further includes a very strong tension resistant belt structure which extends circumferentially about the carcass and is disposed beneath the tread portion. The belt structure again generally terminates in axially outer directions at approximately beneath the outer edges of the ground contacting surface of the tread.

The radial ply tire has increased in popularity in recent years possibly because of its increased tread wear capability, improved skid resistance, capability of developing high cornering forces to resist lateral forces which develop in turns, and its soft riding qualities generally attributable to its soft flexible sidewalls. Even in view of these many improved characteristics of the radial ply tire over the previous bias and bias belted tire, engineers are constantly attempting to gain further improvements in these capabilities in the tires in order to provide the best possible products for the consuming public.

SUMMARY OF THE INVENTION

The present invention relates to an improved composite structure in a radial ply tire which was arrived at by carefully observing and studying the high speed characteristics of racing tires. Such tires are operated at speeds as high as 200 mph and more by professional drivers who are quite experienced in studying the riding and handling characteristics of tires. The operating temperature, pressure distribution throughout the footprint of the tire, lateral force characteristics and steering response are studied in close detail. For example, in such high speed studies of pneumatic tires it has been observed that although radial ply tires develop a much higher lateral force or ability to resist turning forces than do conventional bias or bias belted tires, radial ply tires do exhibit a slight delay or lag in the tire developing these good turning forces. While this slight lag or delay in generating this force is generally not noticeable in the operation of passenger cars, it can be observed in high speed racing tires during high speed turns and maneuvers and, under such conditions, such split second steering response is important. By observing the action of the tires under these conditions, a new overall concept of tire construction has been developed which improves the overall operating characteristics of a radial ply tire.

The present invention, therefore, provides an improved radial ply tire and method of making the same. The invention includes means for providing independent operation of the tread and sidewall areas, means for maintaining even tread pressure distribution throughout the footprint area throughout a wide range of speeds and provides a system of transmitting lateral forces generated during turning maneuvers from the rim to the ground contacting portion of the tread with more speed to thus improve the lateral steering response.

It is an object, therefore, of the present invention to provide an improved radial ply tire particularly with respect to high speed handling characteristics without significant loss in riding qualities.

Other objects will be in part apparent and in part pointed out more in detail hereinafter.

The invention accordingly consists in the features of construction, combination of elements and arrangement of parts which will be exemplified in the construction hereinafter set forth and the scope of the application of which will be indicated in the appended claims.

DESCRIPTION OF THE PREFERRED EMBODIMENTS

Figure 1:
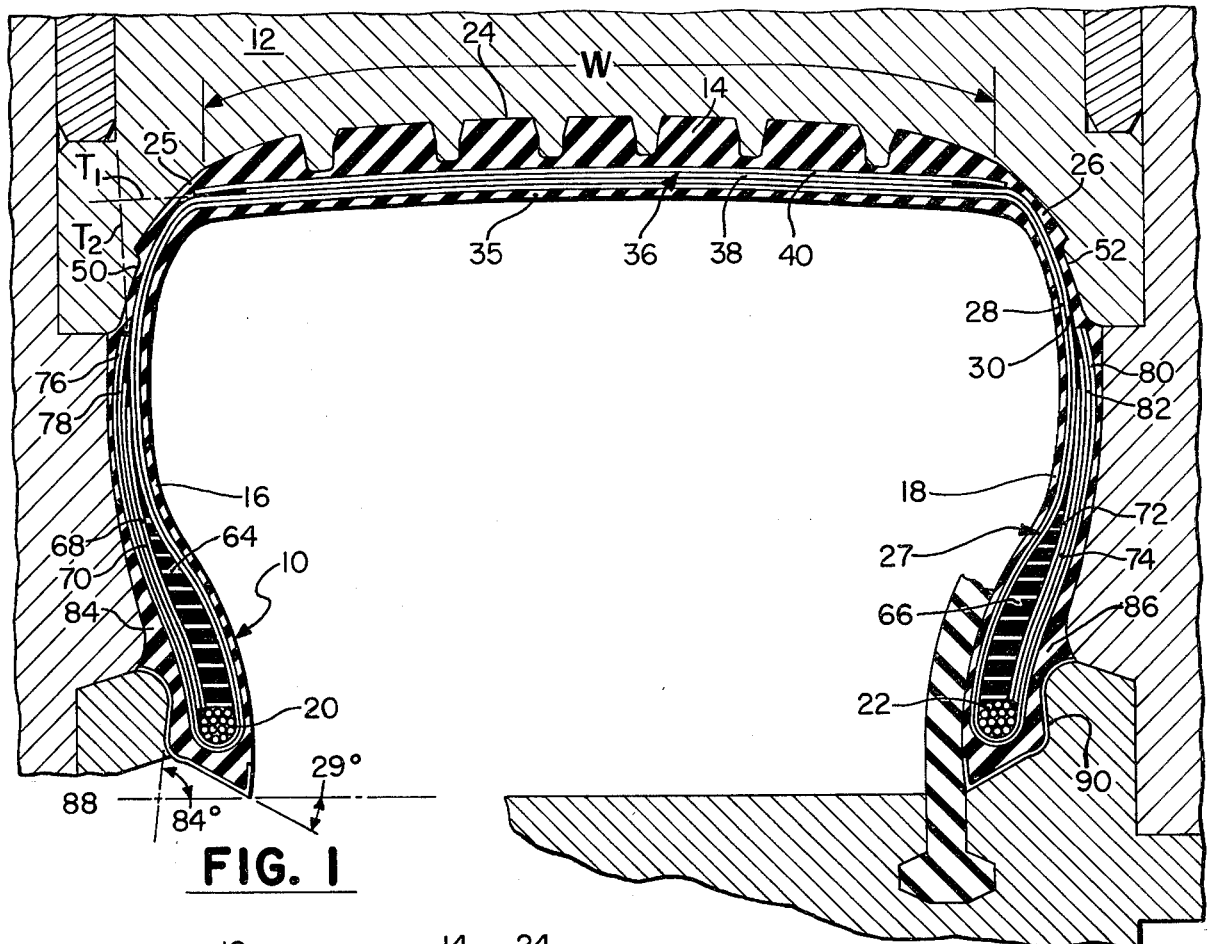
FIG. 1 is a cross-sectional view of a tire constructed in accordance with the present invention and as it appears in tire curing molds.

With reference to the drawings and in particular FIG. 1, there is illustrated a tire 10 confined within a mold 12 in which it is cured. The tire 10 includes a tread portion 14 extending circumferentially thereabout, a pair of sidewall portions 16 and 18 extending radially inwardly from the lateral edges of the tread 14 and terminating in their radially inner extremities in annular bead portions 20 and 22.

The tread portion 14 includes a ground contacting tread surface 24 having a width W when the tire is new and terminating in axial directions in the shoulder portions 25 and 26. For purposes of this invention, the width W of the ground contacting tread portion shall be measured when the tire is mounted on a standard rim, inflated to design inflation pressure and statically loaded to the design load.

The tire 10 includes a cord reinforced carcass 27 which in the particular embodiment illustrated includes two plies 28 and 30 which extend circumferentially about the tire and from the bead portion 20 to the bead portion 22. The plies 28 and 30 are radial plies inasmuch as the cords in the sidewall portions extend substantially in radial directions. In accordance with the present invention a radial ply tire is deemed to include tires whose body plies such as plies 28 and 30 have their cords, at least in the sidewall areas, lying in planes containing the rotational axis of the tire or extending at an angle of not more than 15 degrees with respect to such plane. As is customary in most pneumatic tires, an air impervious inner liner 35 extends circumferentially about the inner surface of the tire and from bead portion 20 to the bead portion 22.

Also, the tire 10 includes a belt structure 36 which extends circumferentially about the carcass 27 and extends in axial directions for at least the axial extent of the ground contacting tread surface 24. It is preferred that this belt structure be of a high modulus material in order to provide sufficient circumferential restriction to provide a substantially rigid tread portion 14. Although two plies 38 and 40 are illustrated, it will be understood that one or more plies could be utilized. The radially innermost belt ply 38 is located directly adjacent the radially outermost carcass ply 30 and is in intimate contact therewith over at least 60 percent of its axial width. By intimate contact is meant that there are no layers of rubber therebetween other than the normal layer applied to the cords during the calendering operation.

Figure 2:
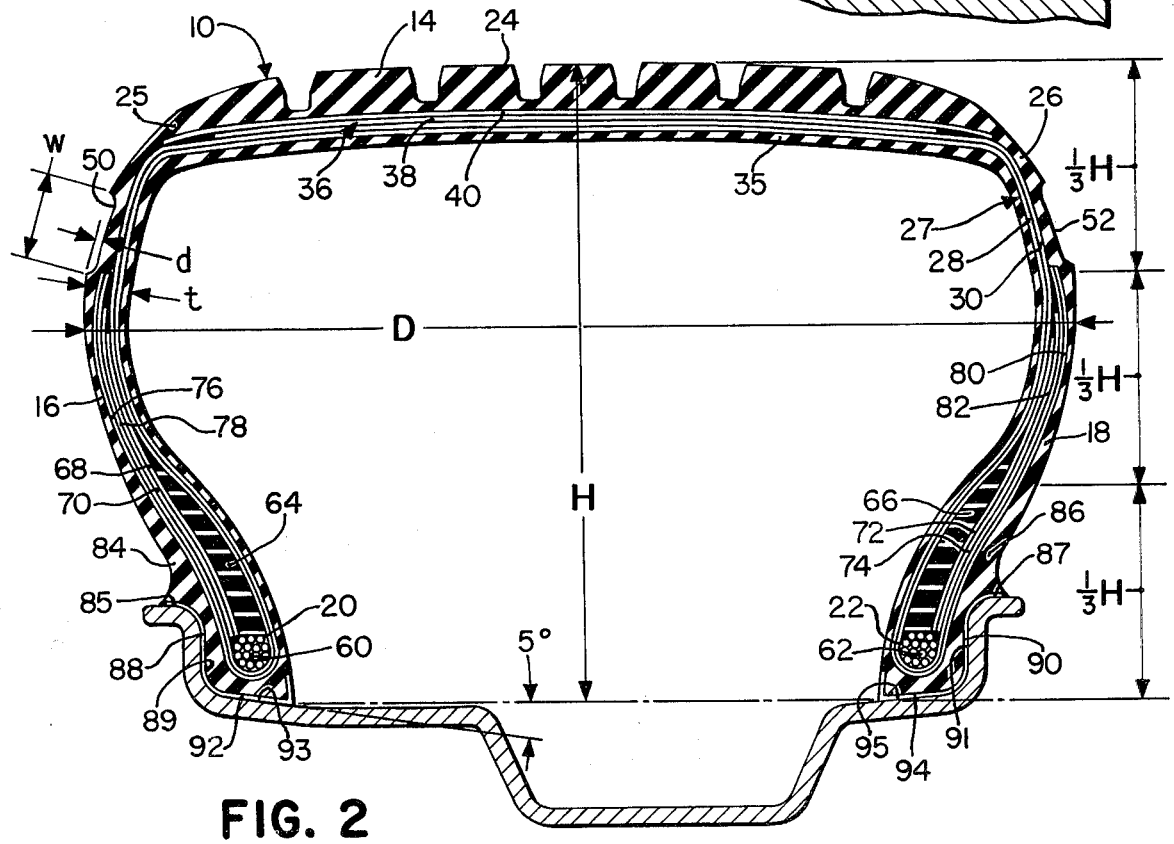
FIG. 2 is a cross-sectional view of the tire of FIG. 1 when mounted on a rim and inflated.

More particularly and with respect to FIG. 2, the particular tire illustrated is a size GR60:15 tire. In accordance with standard nomenclature, this means that the tire is designed to be mounted on a rim having a 15-inch diameter bead seat and the tire, when mounted on a standard rim and inflated, has an aspect ratio of 0.60. The aspect ratio is the ratio of the maximum section width D of the tire to the section height H of the tire when mounted on a standard rim and inflated to design inflation pressure. The present invention is particularly useful in tires having a low aspect of from 0.20 to 0.60.

Means 50, 52 for providing independent action between the sidewalls and the tread portion and thus reduce heat build-up in the shoulder regions 25 and 26 are provided in the radially outer one-third of each sidewall 16 and 18. For purposes of determining areas of the sidewalls in the present invention the section height H of the tire from a line tangent to the radially innermost extremities of the tire cross-section to the radially outermost extremity on the surface 24 of the tread will be considered the total length of the sidewall and the height or radial distances of the sidewall will be measured with respect to these two extremities.

This means 50, 52 includes a significantly reduced gauge in the outer rubber layer of the tire and thus increases the flexibility in this outer sidewall portion. This reduced gauge portion is in the form of an annular recess having a depth d equal to between 15 and 35 percent of the overall thickness $t$ of the sidewall just radially inwardly of the recess.

Figure 3:
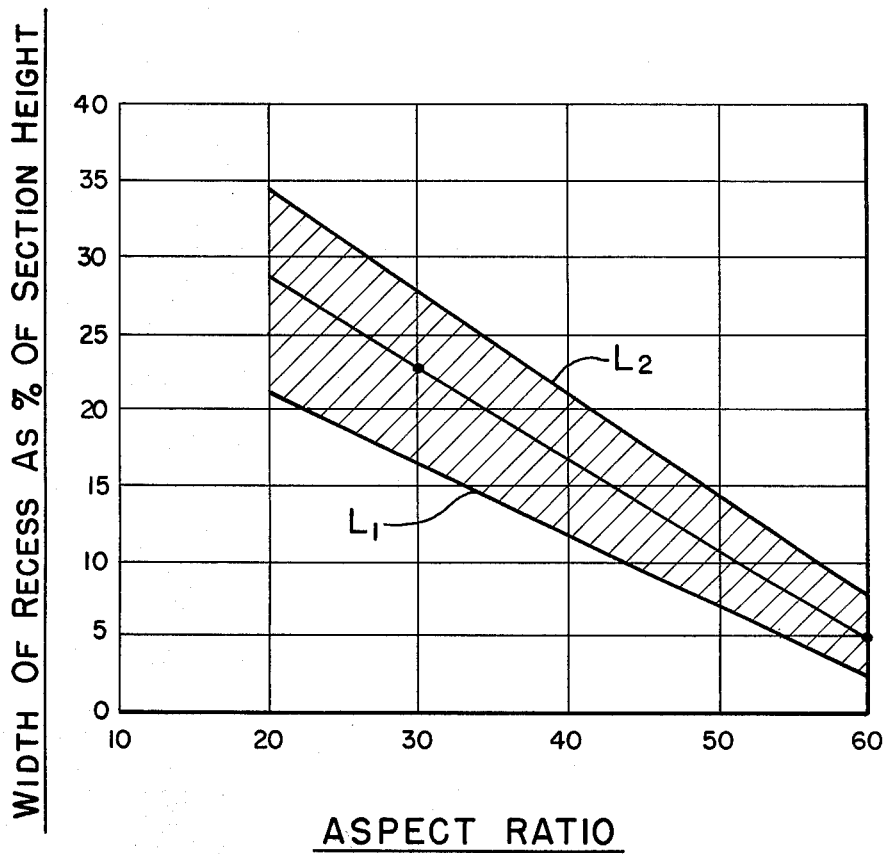
FIG. 3 is a graphical illustration of one of the features of the present invention.

The width $w$ of this reduced thickness portion of the rubber or recess 50, 52 should be inversely proportional to the aspect ratio of the tire and thus be greatest for low aspect ratio tires. Particularly, for example, if the aspect ratio of the tire is 0.60 the width w of the recess should be about 5 percent of the section height H. Thus, in the present invention the section height is 6.50 inches and the width w of the groove is, therefore, 0.325 inches. By way of contrast, if the aspect ratio of the tire were 0.30 the width $w$ of the recess in the outer sidewall portion should be about 22.5 percent of the section height. Thus, if the section height of a 0.30 aspect ratio tire were 3 inches the width of the recess would be 0.675 inches. The preferred range of width $w$ of the recess is illustrated in the graph of FIG. 3 and is included between the lines $L_1$ and $L_2$. Thus, if the aspect ratio of the tire is 0.30 the width of the recess should be equal to between 17.5 and 27.5 percent of the section height of the tire. The recess 50, 52 is located outwardly of the mid-height of the tire and preferably in the radially outer one-third of the sidewall.

The laterally outer edges of the belt structure 36 terminate short of the recesses 50, 52 but extend axially outwardly beyond the edge of the ground contacting surface 24. For purposes of this invention and with respect to the fact that the belt structure does not extend into the area of the recesses 50, 52, the belt structure is not deemed to include overlay material or underlay material which are designed merely to encase the belt structure or belt edges and do not sustain a significant portion or at least 20 percent of the circumferential restricting load of the belt structure. Thus, a low modulus fabric layer covering the belt structure and extending down into the sidewalls should not be considered part of the belt structure when determining the axially outer extremity of such belt structure.

As discussed above, the action of the tread portion and the action of the sidewall portions have been disconnected at least to a certain degree in order to provide cool running properties and maintain the soft riding characteristics of a radial ply tire. However, in order to provide the required capability in the tire to develop strong lateral forces to resist the turning forces and in order to provide quick response during high speed maneuvers, the lower portion of the sidewall from at least the mid-height of the tire to the bead portion is provided with a unique reinforcing system.

A hard rubber apex strip 64, 66 extends radially outwardly from each annular inextensible bead core 60, 62 in the respective bead portions 20, 22 and circumferentially about the tire. Each apex strip 64, 66 tapers to a point located within the middle one-third of the sidewall and is made of substantially hard rubber in excess of 80 durometer and preferably at least 90 durometer.

Two plies 68, 70, 72, 74 of high modulus cord fabric extend radially outwardly from approximately the bead cores 60 and 62 at least to the mid-height of the tire. These cords extend at an angle of between 40° and 75° with respect to a plane containing the rotational axis of the tire and the cords in one layer are crossed with respect to the cords in the next adjacent layer.

The lateral ends 76, 78 and 80, 82 of the respective carcass plies 28 and 30 are wrapped about the respective bead cores 60 and 62 and extend radially outwardly therefrom to a point radially inwardly of the respective recess 50, 52. These turn-up portions thus completely cover the apex strips 64, 66 and the reinforcing layers 68, 70, 72 and 74.

An additional bridging support means 84, 86 extends circumferentially about the tire and adjacent the ply endings 76 and 88 in the lower sidewall region of the tire. This support means comprises a wedge of hard rubber having a durometer of at least 80 and preferably at least 90. This means 84 and 86 is specially designed to provide support or bridge between the rim flange surface 85, 87 and the lower sidewall portion of the tire.

The radially inner surface of the means 84 and 86 bears down tightly against the respective rim flange surface 85, 87. Additionally, the annular axially outer surface 88 and 90 of each bead portion bears against the corresponding surface 89 and 91 of the rim flange. This surface of the rim flange is substantially planar in that it extends at an angle of 90 degrees with respect to the rotational axis of the tire.

The radially inner surface 92, 94 of each bead portion 20 and 22 is firmly and wedgingly seated on the corresponding surface 93 and 95 of the rim. The surfaces 93 and 95 of the rim are in the form of a cone which forms an angle of 5° with respect to the rotational axis of the tire. In the particular embodiment illustrated, the tire 10 is mounted on a rim having a 7-inch axial spacing between the annular surfaces 89 and 91.

With reference again to FIG. 1, the tire 10 when in the mold and thus when the configuration in which it was cured has a spacing of 8.12 inches between the annular surfaces 88 and 90 of the bead portion. This surface 88, 90, when the tire is in the mold, forms an angle of about 84° with respect to the rotational axis of the tire. For optimum results this angle should be between 75° and 85°. Further, there is a conical taper on the radially inner surfaces 92 and 94 of each bead portion which forms an angle of 29 degrees with respect to the rotational axis of the tire. Thus, it can be seen that the tire, when in the configuration in which it was cured, has a larger bead spacing than when it is on the rim and inflated. Further, it can be seen that the bead portions when being moved toward each other and mounted on the rim are rotated about an angle and put in compression both against the conical bead seat surfaces 93 and 95 and against the planar rim flange surfaces 89 and 91. The surfaces 88 and 90 and thus the bead portions 20 and 22 are, therefore, rotated through an angle of between 5° and 15°.

The cords in the sidewall are thus placed under a certain amount of tension stresses. This is particularly true of the reinforcing strips 68, 70, 72 and 74 and the turn-up portions 76, 78, 80 and 82 located axially outwardly of the hard rubber apex strips 64, 66.

The outer wedge strips or bridging strips 84, 86 are placed in a prestressed compressive condition in that they are pressed between the reinforcing layers 76, 78, 80 and 82 and the turn-up layers 68, 70, 72 and 74 and the rim flange surfaces 85, 87. This provides additional tension in these particular reinforcing layers. This prestressed condition of the lower sidewall areas helps provide the improved lateral stability as well as very quick steering response when making high speed turning maneuvers.

Also in accordance with the present invention, when the tire is in the configuration in which it is cured a tangent $T_1$ to the carcass cords at a point directly radially inwardly of the axially outer extremity of the ground contacting portion is perpendicular to a tangent $T_2$ to the same carcass ply in the respectively adjacent sidewall at a point just radially inwardly of the disconnecting means 50. It will be appreciated that this tangent may vary somewhat from the precise points described above but in any event should not be more than one-fourth of an inch in either direction from the respective tangent point with respect to passenger car tires or racing tires.

Thus, it can be seen that during mounting of the tire the lower sidewall portions being rotated through an angle from their position in the mold to their prestressed condition on the rim provide increased tension in the sidewall plies. This increased tension is further increased by the preloading of the support strips 84, 86 when they are forced against the rim flange surfaces 85, 87 during the mounting operation. Further, the disconnecting means 50, 52 permit independent operation of the tread and sidewalls to thus provide a cool running tread and maintain the soft riding qualities and at the same time the prestressed condition of the cords in the sidewalls which extend through the flexible area and are in intimate contact with the belt structure tend to hold the shoulder portions firmly and thus maintain a flat uniform contour of the tread throughout a wide range of speeds and thus provide even, uniform pressure distribution throughout the footprint area. The increased rigidity of the lower half of the sidewall portions as well as the increased tension of the supporting structures throughout the sidewall provide a firm connecting means between the rim and the tread portion which results in a capability of developing extremely high lateral forces to resist turning forces as well as very quick steering response.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire comprising a tread portion including a non-skid tread surface extending circumferentially thereabout; a pair of annular bead portions each including an annular inextensible bead core, a radially inner base surface, and an axially outer flange engaging surface; a sidewall portion extending between each axially outer edge of said tread portion to the respectively associated bead portion; a carcass structure extending from bead portion to bead portion; and a belt structure extending circumferentially about said carcass structure the improvement comprising; means extending circumferentially about said tire and disposed in the radially outer one-third of each sidewall portion to provide a flexible transition between said tread portion and the sidewall portions and said carcass structure including at least one carcass ply of continuous cord reinforced fabric extending circumferentially about the tire and from bead to bead at an angle of between 0° and 15° with respect to planes containing the rotational axis of the tire and wherein said tire was curved in a configuration in which two straight lines lying in a single plane containing the rotational axis of the tire and tangent respectively to said fabric at a point radially inwardly of the axially outer edge of said ground contacting surface and a point in the next adjacent sidewall located next adjacent the radially inner edge of said means are perpendicular to each other.

2. A tire as claimed in claim 1 wherein the axially outer ends of said ply of tire cord fabric extend axially outwardly about the respectively associated bead core and radially outwardly therefrom to a point within the radially outer one-third of said sidewall portion to reinforce the sidewall.

3. A tire as claimed in claim 2 further including an annular apex strip of reinforcing rubber having a hardness of at least 80 durometer which extends radially outwardly of each bead core and tapers to a point located in the middle one-third of the section height of the tire and further including a pair of reinforcing stabilizers each comprising a ply of continuous high modulus cords disposed at an angle of between 40° and 70° with respect to a plane containing the rotational axis of the tire with the cords in one layer being crossed with respect to the cords of the next adjacent layer.

4. A tire as claimed in claim 1 further including an annular apex strip of reinforcing rubber having a hardness of at least 80 durometer which extends radially outwardly of each bead core and tapers to a point located in the middle one-third of the section height of the tire and further including a pair of reinforcing stabilizers each comprising a ply of continuous high modulus cords disposed at an angle of between 40° and 70° with respect to a plane containing the rotational axis of the tire with the cords in one layer being crossed with respect to the cords of the next adjacent layer.

5. A tire as claimed in claim 4 further including an annular bridging strip of rubber having a hardness of at least 90 durometer for engaging the radially outer surface of each lip of the rim on which the tire is mounted and the axially outer surface of the reinforcing members in the respective sidewall of the tire to support the radially inner portion of the sidewall of the tire and provide increased tension in said reinforcing members.

6. A tire as claimed in claim 5 wherein when said tire is in the configuration in which it was cured each flange engaging surface is in the form of a truncated cone forming an angle of between 75° and 85° with respect to the rotational axis of the tire and when mounted on a rim said rim engaging surfaces are in the form of a planar surface and thus the bead portions have been rotated through an angle of between 5° and 15° to provide a preloaded compression stress in the radially inner portions of the radially inner surfaces of each said bridging strip.

7. A radial ply pneumatic tire comprising a tread portion including a non-skid tread surface extending circumferentially thereabout; a pair of annular bead portions each including an annular inextensible bead core, a radially inner base surface, and an axially outer flange engaging surface; a sidewall portion extending between each axially outer edge of said tread portion to the respectively associated bead portion; a carcass structure extending from bead portion to bead portion; and a belt structure extending circumferentially about said carcass structure and improvement comprising; the axial distance between said flange engaging surfaces being between 10 and 30 percent greater when the tire is in the configuration in which it was cured than when said tire is mounted on a rim; the axial width of said ground contacting surface being less than said axial distance between said flange engaging surfaces when said tire is mounted on a rim by an amount up to 10 percent of said axial distance; and said flange engaging surface being planar when the tire is mounted on a rim and inflated and in the form of a truncated cone forming an angle of between 75° and 85° with respect to the rotational axis of the tire when in the configuration in which it was cured.

8. A tire as claimed in claim 7 further including an annular apex strip of reinforcing rubber having a hardness of at least 80 durometer which extends radially outwardly of each bead core and tapers to a point located in the middle one-third of the section height of the tire and further including a pair of reinforcing stabilizers each comprising a ply of continuous high modulus cords disposed at an angle of between 40° and 70° with respect to a plane containing the rotational axis of the tire with the cords in one layer being crossed with respect to the cords of the next adjacent layer.

9. A tire as claimed in claim 8 further including an annular bridging strip of rubber having a hardness of at least 90 durometer disposed radially outwardly of each flange engaging surface for engaging the radially outer surface of each lip of the rim on which the tire is mounted and the axially outer surface of the reinforcing members in the respective sidewall of the tire to support the radially inner portion of the sidewall of the tire and provide increased tension in said reinforcing members.

10. A tire as claimed in claim 9 further including an annular recess extending circumferentially about the tire in the outer surface of the radially outer one-third of each sidewall said recess having a depth of between 10 and 40 percent of the thickness of said sidewall adjacent the radially inner extremity of said recess and said recess having a width within the range defined by the graph of FIG. 3.

11. A tire as claimed in claim 10 wherein the axially outer ends of said ply of tire cord fabric extend axially outwardly about the respectively associated bead core and radially outwardly therefrom to a point within the radially outer one-third of said sidewall portion to reinforce the sidewall.

12. A tire as claimed in claim 11 wherein each axially outer extremity of said belt structure is located between the respective axially outer edge of the ground contacting surface and the next adjacent recess in said sidewall.

13. A radial ply pneumatic tire comprising a tread portion including a nonskid tread surface extending circumferentially thereabout; a pair of annular bead portions each including an annular inextensible bead core, a radially inner base surface, and an axially outer flange engaging surface; a sidewall portion extending between each axially outer edge of said tread portion to the respectively associated bead portion; a carcass structure extending from bead portion to bead portion; a belt structure extending circumferentially about said carcass structure; and an annular bridging strip of rubber having a hardness of at least 90 durometer disposed radially outwardly of each flange engaging surface for engaging radially outer surface of each lip of the rim on which the tire is mounted and the axially outer surface of the reinforcing member in the respective sidewall of the tire to support the radially inner portion of the sidewall tire and provide increased tension in said reinforcing members.

14. A tire as claimed in claim 13 characterized by the axial spacing between the flange engaging surfaces of the bead portions when the tire is in the configuration in which it was cured being greater than the axial spacing between said flange engaging surfaces when said tire is on a rim and inflated.

15. A tire as claimed in claim 14 wherein the axial width of said ground contacting surface is less than the axial spacing between said flange engaging surfaces when said tire is mounted on a rim by an amount equal to up to 10 percent.

16. A tire as claimed in claim 15 wherein when said tire is in the configuration in which it was cured each flange engaging surface is in the form of a truncated cone forming an angle of between 75° and 85° with respect to the rotational axis of the tire and when mounted on a rim said rim engaging surfaces are in the form of a planar surface and thus the bead portions have been rotated through an angle of between 5° and 15° to provide a preloaded compression stress in the radially inner portions of the radially inner surfaces of each said bridging strip.

17. A tire as claimed in claim 16 wherein said means comprises an annular recess in the outer surface of said sidewall, said recess being equal in depth to between 15 and 35 percent of the thickness of said sidewall at the radially inner extremity of said recess.

18. A tire as claimed in claim 17 wherein the width of said recess is within the range defined by the graph of FIG. 3.

19. A tire as claimed in claim 18 wherein each axially outer extremity of said belt structure is located between the respective axially outer edge of the ground contacting surface and the next adjacent recess in said sidewall.

* * * * *

UNITED STATES PATENT OFFICE
CERTIFICATE OF CORRECTION

PATENT NO. : 3,961,657
DATED : June 8, 1976
INVENTOR(S) : Dennis S. Chrobak

It is certified that error appears in the above-identified patent and that said Letters Patent are hereby corrected as shown below:

Column 5, line 13, "in" was omitted after "when".

Column 6, claim 1, line 45, "curved" should read -- cured --.

Signed and Sealed this

Twenty-first Day of September 1976

[SEAL]

Attest:

RUTH C. MASON
Attesting Officer

C. MARSHALL DANN
Commissioner of Patents and Trademarks